United States Patent [19]
Ermlich

[11] 3,915,562
[45] Oct. 28, 1975

[54] REAR VIEW SYSTEMS FOR AUTOMOTIVE VEHICLES

[75] Inventor: John R. Ermlich, Goleta, Calif.

[73] Assignee: John R. Ermlich, Inc., Goleta, Calif.

[22] Filed: Nov. 15, 1974

[21] Appl. No.: 523,989

Related U.S. Application Data

[63] Continuation of Ser. No. 392,988, Aug. 30, 1973, abandoned, which is a continuation of Ser. No. 230,890, March 1, 1972, abandoned.

[52] U.S. Cl. ............. 350/302; 350/301; 350/307
[51] Int. Cl.² ........................................ G02B 5/08
[58] Field of Search .......... 350/279, 288, 289, 299, 350/301, 302, 304, 307

[56] References Cited
UNITED STATES PATENTS

| | | | |
|---|---|---|---|
| 1,617,270 | 2/1927 | Paul | 350/302 |
| 1,913,874 | 6/1933 | Folberth et al. | 350/279 |
| 2,085,000 | 6/1937 | Borba et al. | 350/302 |
| 2,252,161 | 8/1941 | Borba | 350/302 |
| 2,806,408 | 9/1957 | Moeller | 350/279 |
| 3,463,578 | 8/1969 | Smith | 350/302 |
| 3,468,601 | 9/1969 | Smith | 350/307 |
| 3,645,607 | 2/1972 | Whitney | 350/302 |
| 3,704,062 | 11/1972 | Toy | 350/307 |

Primary Examiner—Ronald L. Wibert
Assistant Examiner—F. L. Evans
Attorney, Agent, or Firm—Charles W. Swope

[57] ABSTRACT

An over-the-roof type of rear view system, centered on the driver and comprising three plane mirrors which include: a viewing mirror, adjustable about a horizontal axis to accommodate drivers of differing eye heights, and settable about the same axis into detented positions that provide selective vision directly through the rear window as well as through the system; an environmental window, angled to avoid collecting dirt snow and rain; a particularly oriented field mirror, for receiving light rays passing through the environmental window; a relay mirror, located between and particularly oriented relative to the viewing and field mirrors and rigidly connected to the field mirror to vibrate with it as a pair; and means for protecting the mirrors from the weather and for limiting the passage of unwanted light rays into and through the system.

6 Claims, 4 Drawing Figures

REAR VIEW SYSTEMS FOR AUTOMOTIVE VEHICLES

This is a continuation of application Ser. No. 392,988, filed Aug. 30, 1973, now abandoned, and which, in turn, is a continuation of application Ser. No. 230,890, filed Mar. 1, 1972 (abandoned).

BACKGROUND OF THE INVENTION

1. Field of the Invention

The present invention relates broadly to optical systems, and more particularly to an improved rear view system designed to provide an enlarged rearward field of view, with a minimum of distortion, blind spots, and interference with forward vision through the windshield, for drivers of all heights.

2. Description of the Prior Art

Conventional types of in and out-of-the vehicle rear view systems, which involve an adjustable mirror forwardly of the driver and by which he obtains a view, through the backlight in one case and alongside of the automobile in the other, are of course old and well known. Also, periscopic type over-the-roof rear vision devices, involving the use of multiple reflecting surfaces on various kinds of mirrors, prisms and the like, have been suggested.

However none of these has proved adequate to meet the urgent and continuing need for a rear view system that will provide drivers of present day automobiles travelling on crowded, high speed thoroughfares with the quality and range of rearward vision that is essential to their own safety, that of their passengers, and of others on the road.

As evidence of this, the National Highway Traffic Safety Administration of the Department of Transportation has, during the past year, publicized its intention to fund an investigative study to "develop practical cost effective methods for eliminating the rear view blind area so that appropriate standards can be written."

SUMMARY OF THE INVENTION

According to this invention there is provided a rear view system (sometimes hereinafter called RVS) that will meet the general objectives of and satisfy specific design requirements set up in the Department of Transportation's current study.

More particularly it is a primary object of the invention to present a "natural" view of a rearward field that is superior both laterally and vertically to that heretofore attainable, together with freedom from obscuration of either the rearward or of the forward fields of view.

Another object is the provision, with such a system, of good image quality, freedom from glare, adequate light transmission and unity magnification.

Another object is to provide a system of this character that combines adequate structural integrity in itself with minimum weakening of the roof structure of the automobile.

Another object is to increase the safety factor by the provision of padding, and collapse and breakaway features, for components of the system that protrude into the passenger compartment.

Still another object is to provide a practical system which is relatively inexpensive and does not impose excessive aerodynamic or styling penalties.

Further objects and advantages will become apparent during the course of the following description, when taken in connection with the accompanying drawings.

BRIEF DESCRIPTION OF THE DRAWINGS

In the drawings, wherein like numerals refer to like parts throughout.

DESCRIPTION OF A PREFERRED EMBODIMENT

Figure 1:
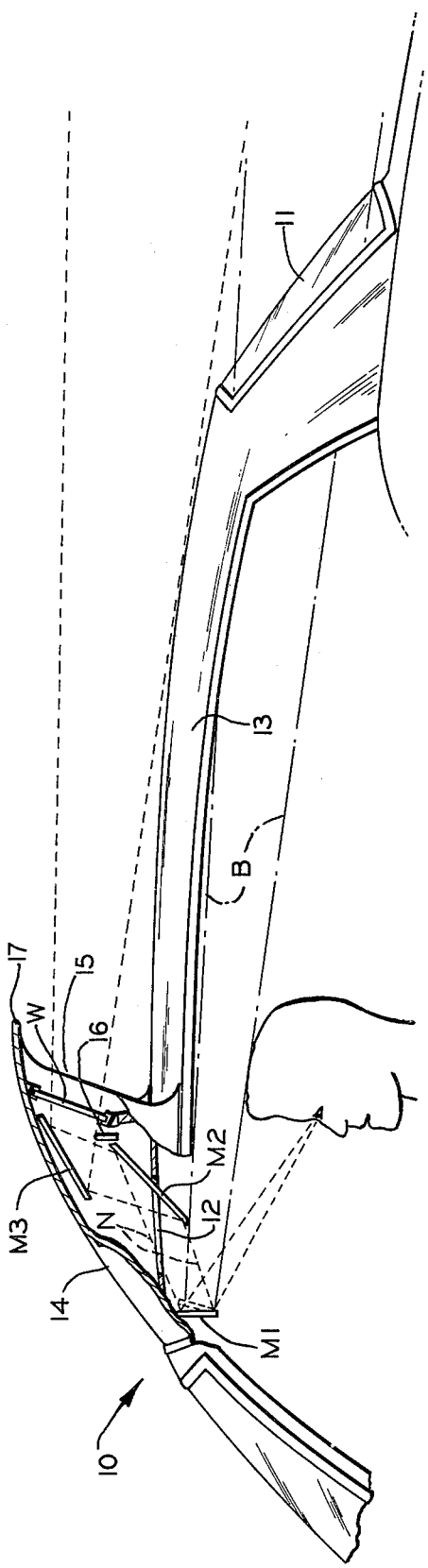
FIG. 1 is a schematic, longitudinal, vertical sectional view through an automobile equipped with a preferred form of the rear view system of the invention.

As best illustrated in FIG. 1, the RVS of this invention is made up primarily of three plane mirrors M1, M2 and M3, and an environmental window W, all associated with the roof of an automobile 10. Of these elements, M1 is the viewing mirror into which the driver looks and from which the field of rear vision is reflected to him. It is mounted in the car, forwardly of and above the driver's eye position and is tiltable, in a manner to be more fully hereinafter described, to permit the driver's vision to be directed either through the rest of the RVS or through the backlight 11 of the automobile.

The mirrors M2 and M3 function respectively as a relay mirror and a field mirror and are rigidly mounted together as a pair, or single unit which extends upwardly through an opening 12 in the roof 13. The field mirror M3 receives images from the field of rear vision available to the device and reflects them downwardly and forwardly to the relay mirror M2 which, in turn receives and reflects them forwardly and downwardly to the viewing mirror M1. Differently stated, the relay mirror M2 acts to direct the driver's vision from the viewing mirror M1 to the field mirror M3 which, in turn, directs it toward the field of rear vision.

A suitable housing or shroud 14 for the field and relay mirror combination is mounted over the opening 12 in the car roof and is provided with a rearwardly facing opening 15 which is equipped with a transparent closure in the form of the environmental window W.

As has already been indicated, one of the important features of the invention resides in the location and orientation of the primary or optical elements of the system. Thus, in a preferred embodiment, these optical elements, which comprise mirrors M1, M2, M3 and window W, are all centered on the driver's body centerline which, for layout purposes, may generally be considered as 14.5 inches from the centerline of the vehicle. All of the optical elements may be fixedly mounted except for mirror M1 which should be mounted for rotation about a transverse horizontal axis, with a sufficient rotational angular range to (1) accommodate drivers of all heights and (2) to permit its being set in either one of two detented positions that provide a driver with the choice of directing his rearward vision either through the system or through the backlight, that has already been referred to.

Adapting the RVS of this invention to an automobile into which it is to be incorporated begins by considering the location longitudinally and in height (above the road) of the rear edge of the car roof, together with the desired distance behind the bumper at which the road surface will begin to be seen.

For example, a 56 inch roof edge elevation may be taken as representative, and a road view that begins approximately 50 feet behind the car is acceptable and can be attained with a downward viewing angle of −4° 52′. However, I have found that a slightly lower viewing angle of −5° is preferable for design purposes and also will permit the ground view to begin only 48.8 feet behind the rear bumper.

Accordingly, this minus 5° line, tangent to the rear roof edge, establishes in the preferred form of the invention a basic design parameter for determining the lower edge of both the environmental window and the mirror M3, depending on their longitudinal stations.

A second design parameter is arrived at by determining the windshield slope at various lateral stations and then limiting mirror M3 to fall below the extrapolated windshield slope line at the outermost station and all other stations to be used by mirror M3. This design parameter is largely a concession to styling, wherein the RVS roof shroud is not to exceed the windshield slope. This effectively avoids a "taxicab" or "1875 locomotive smokestack" appearance.

Such a design is also more desirable aerodynamically in avoiding air turbulence above the windshield, thereby assisting rain and snow to be directed backward over the roof, rather than to remain in the upper windshield area.

A third design parameter is the location of the lower edge of mirror M1 such that it will not obscure the windshield upper view by even the tallest drive. With the system as shown in FIG. 1, no such obscuration occurs, yet mirror M1 is low enough to permit the prior-discussed dual mode of operation which provides an optional view through the backlight. An additional aspect of this design parameter is one of assuring that the driver's upward viewing angle is not excessively large.

It is generally agreed that an optimum upward viewing angle is within a region lying between 15° and 35° from the horizontal and two factors favor the larger angles. Firstly it is desirable to separate the windshield view from the rear view in order to avoid driver confusion. With larger angular RVS fields, this becomes a more important factor than with presentday conventional rear view mirrors.

Secondly, it is desirable to maintain a reasonably, large upward viewing angle to minimize glare from trailing vehicle headlights. Presently, so-called "2-way" or "3-way" rear view mirrors are employed to this end. However such mirrors, often with 80, 20, and 4 percent reflectances, require manual action to switch reflectances, and they reduce the ability to detect trailing vehicles in adjacent traffic lanes by reason of their reduced reflectances. The high viewing angle of the present system on the other hand effectively uses the driver's eyelids as glare stops; and this, when combined with the high viewing station of the RVS above the roof, inherently accomplishes the desired result.

A fourth design parameter for the RVS is the location of the lower edge of the second mirror M2. It is desirable that this element lie above the headliner and padding, in order to minimize the danger of head injuries in vehicle roll-over or in encountering severe road bumps or dips which might cause the driver to be propelled upward. Driver constraints lessen this hazard, but the present system has been designed to "bury" the mirror M2 as high into the protective overhead structure as other parameters will permit.

A fifth design parameter is one of causing the ray bundles to require a minimum opening of the roof. This is a structural consideration. The lateral opening is dependent on lateral field of view, hence not subject to much design latitude. The fore and aft opening, however, is dependent on the location of the mirrors, particularly M2 and M3. The RVS of this invention has been designed, within the constraints of the other design parameters, to minimize this opening and to hold it to approximately 2 ¾ inches for most cars.

A sixth design parameter is the limitation imposed by the vehicle width and the lateral location of the driver. The vehicle width establishes the width of the final optical elements, which are the third mirror M3 and the environmental window W.

Measuring from the driver centerline to the left-most location available for M3 or W establishes the half-width of these final elements. This half-width divided by the total ray path distance from the driver's eye gives the tangent of the lateral field of view half-angle. Clearly, this ray path distance will differ for various drivers, and will differ for various elevation angles in the visual field, hence so will the lateral field angle vary for different drivers and elevation field angles.

Needless to say, the designer must also work within an implicit but rigid requirement: The laws of optical reflectance must be obeyed. Fresnel's Law of Reflection must be satisfied throughout the system.

These design parameters, largely optical, but also considerate of safety, structural, aerodynamic, maintenance, cost and styling factors, do not constitute a design formula but rather give the RVS designer limits and guidelines within which to arrive at a best design. While some compromises become necessary, the designer actually is left with little latitude in arriving at his final design.

Having completed the RVS design, employing some iteration of mirror positions and angles, the designer must next consider light rays which he does not wish the driver to observe.

Flat black paint applied to the interior of the RVS is effective in minimizing stray rays which otherwise will reduce image contrast due to glare and may cause confusion by permitting bright sources (sun, following headlights) to be observed after reflection from the mounting structure, even when such sources lie outside the designed field of view.

Beyond this, light baffles may be required to limit the visual field from other spurious images. Thus a baffle 16 (FIG. 1) is used to limit the downward viewing angle as a means of blocking reflections from the vehicle roof; and the RVS shroud 14 is extended at the top as shown at 17 to avoid direct viewing of the sky from a mis-positioned M1. By locating the upper edge of the baffle 16 tangent to the minus 5° line that is tangent to the rear roof edge, the baffle will act to prevent the driver's seeing sun glints from the rearward section of the roof, and to keep sunlight reflected therefrom from entering the system.

A final step in design consists of generating an optical "tunnel diagram" in which all elements, i.e. mirrors and window, are treated as windows. This procedure permits a straight line unfolded layout of the system, where the mirrors and window are shown inclined at the reference ray. The tunnel diagram serves to confirm the optical design of the system, and permits a ready examination of the various ray intersections with the surfaces of the elements. The tunnel diagram further permits the examination of "peeking" fields, wherein the driver moves his head laterally or vertically to extend his field of view. Finally, it shows directly any unused areas of the elements so that these may be eliminated from the design.

Figure 4:
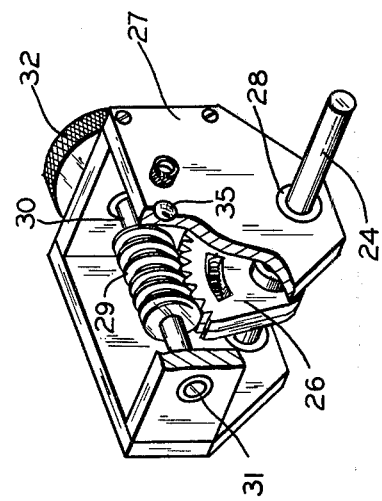
FIG. 4 is a view similar to FIG. 3 but with the support arm removed and part of the gear box wall broken away.
Figure 3:
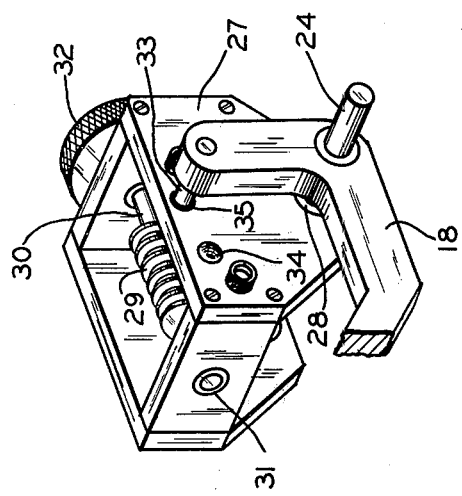
FIG. 3 is a perspective view of the inboard support arm and the gear box for the viewing mirror of the system of FIG. 1.
Figure 2:
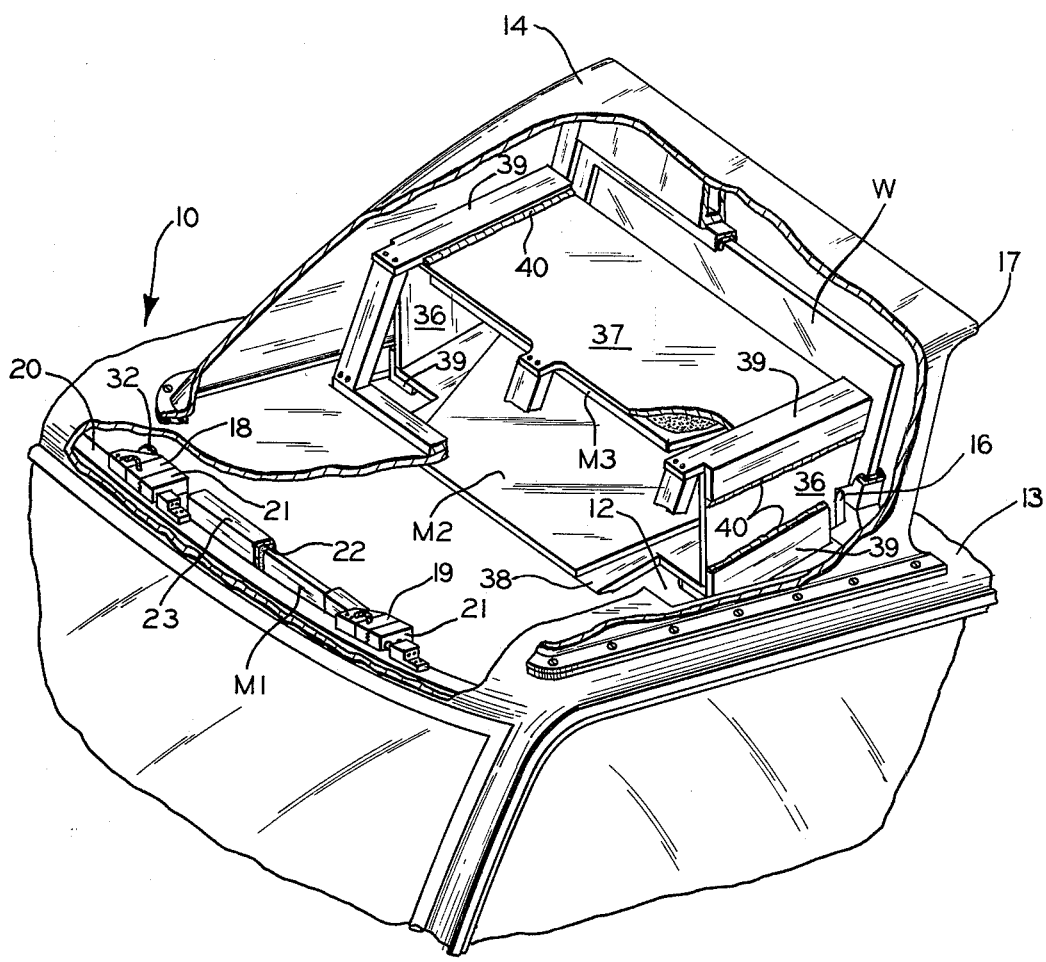
FIG. 2 is a perspective view of the system of FIG. 1, from a position forwardly and upwardly of the driver's side of the car, with portions of the mirror housing, the automobile top, and the mirror mounting means broken away.

The manner of mounting the three mirrors is best shown in FIGS. 2, 3 and 4 of the drawings, with the latter two figures being specifically concerned with details of a part of a preferred mounting for the viewing mirror M1.

Thus, as indicated in FIG. 2, a pair of spaced support arms 18 and 19 are secured to the windshield header 20 of the automobile and mounted to extend therefrom into the interior of the car by a breakaway or collapsible structure 21, not being claimed in this application but which is designed to give way under a measured collapse and breakaway force while yet remaining rigid during normal operation of the vehicle. Alternately, the support arms may simply be bolted to the header 20 with "breakaway" bolts which are equipped with a weakened section that will fail under a predetermined load.

The mirror M1 is secured by an adhesive 22 within a milled out frame 21 that is provided at its opposite ends and adjacent its lower edge with shafts 24 extending outwardly therefrom and journaled in the supporting arms 18 and 19. This arrangement permits tilting of M1 about a pivot point adjacent its lower edge in the manner illustrated by the full and broken lines in FIG. 1, and the way in which such tilting movement can be implemented and controlled is best shown in FIGS. 3 and 4.

Specifically, the inboard shaft 24 of the frame 21 extends through and beyond the inboard support arm 18, through an antibacklash worm sector wheel 26 which is keyed to the shaft and supported thereby within a gear box or housing 27 that is pivotally mounted on the shaft 24 through journals 28 (FIG. 4). The gear box 28 also contains a worm 29, supported in meshing engagement with the sector wheel 26 on a shaft 30 journaled in walls of the housing 27 as at 31. This, especially with a preferred gear ratio of 48:1, provides an effective mechanism for reducing motion transmitted to the shaft 24 by turning of a knob 32. The knob is keyed to the inboard end of the shaft 30, outside the housing 27, and so permits drivers of different heights to both quickly and accurately adjust the angular position of viewing mirror M1 to accommodate the rear view system to their particular normal eye position.

To make such adjustment with the knob 32, the housing 27 must of course be in a fixed angular position on the shafts 24 and in the preferred form, the housing is adapted to be retained in either one of two such positions, relative to the support arm 18, by means of a ball plunger 33 carried by the arm and engageable with arcuately spaced detents 34 and 35 in the adjacent wall of the housing or box 27 (FIG. 3).

The mounting of the viewing mirror M1 in this way permits it to be instantly set in either of two detented angular positions. In one of these (shown in FIG. 3) the viewing mirror may be said to be in the "normal mode" because it directs the driver's line of sight along the line N in FIG. 1 through the remainder of the RVS. The other position (with the ball plunger 23 engaged in and co-acting with the detent 34 and which may be termed the "backlight mode") permits the driver to view through the backlight, along the line B in FIG. 1, and so to gain a close-in rear view for backing or for momentarily examining the road behind for closely following vehicles of low profile. By way of example shifting to the backlight mode in the form of the invention illustrated here expands the driver's road view from 48.8 feet behind, to within 37.7 feet of, the rear bumper.

Mode switching is accomplished by merely pushing or pulling the knob 32 to swing the gear box 28 bodily about the shafts 30 from one detented position to the other, and so "set" the mirror M1 in the desired mode. Consequently the switching of modes is a rapid volitive procedure and permits both a quick look at the nearby rearward field through the backlight whenever desired and a rapid return to the normal mode. An important feature of this is that the rotation of viewing miror M1 between normal and backlight viewing in the system of this invention is the same for all drivers, specifically through an angle of 13° 19' in the design shown. This permits a single pair of detents to serve all drivers in any car, although different angles (from 5° to 20°) may be required for various style vehicles.

To provide all drivers with the same lower field of view in either mode the location of the axis about which the viewing mirror M1 tilts is specific and, in the preferred form of the system, the axis of rotation passes through the front surface of the mirror at approximately 0.030 inch above its lower edge. This permits the minus 5° ray to act as the reference ray for the normal mode and a minus 5° 23' ray to act as a reference ray for the backlight mode and preserves these lower rays for all drivers regardless of the height of their eye positions. In other words, these rays traverse the remainder of the RVS (or go through the backlight) along the same path for all drivers, and only rays above these differ for the various drivers. In this fashion, the required extent of road surface view is maintained for all drivers in both modes of operation.

Moreover, the vertical angular field of view is sufficiently large to simultaneously permit an upward and rearward view for all drivers in the normal mode of operation, thereby preserving an adequate view to the rearward horizon, and any driver can accurately position the angle of the miror M1, relative to the housing or gear box 28, in a manner to make optimum use of the vertical field of view of the RVS by turning the knob 32 to operate the worm and wheel segment drive 29–26, which drive also serves to prevent vibrational slippage of the mirror setting.

For this purpose, and to insure easy and accurate adjustments, the gear ratio is preferably chosen to permit 3.3 turns of the knob to cover the complete range of drivers with reasonably normal body and leg lengths, while an easily attained 4° knob setting provides a desirable angular setting accuracy of 0° 5' for M1.

Following the preferred design parameters and orientation of the relay and field mirrors M2 and M3 within the system (FIG. 1), will result in their both being located upwardly and well aft of M1; in their being in close proximity and in generally vertical alignment with one another but with M3 slightly aft of M2; with M2 being at an angle of between 40° and 50° from the horizontal plane for most cars, and M3 being inclined more than 25° and less than 45° from the horizontal and more toward the horizontal than M2. With this arrangement the fore and aft dimension of the roof opening 12 can be kept quite small and car roof strength maintained correspondingly. For example a fore and aft dimension of 2 ¾ inches for the opening 12 is readily attained and a 6 inch opening is considered structurally acceptable.

Another, and extremely important feature is that the mirrors M2 and M3 are angularly locked in fixed relative orientation or, differently stated, are mounted to vibrate as a pair. This is accomplished in the illustrated embodiment by means of side plates 36 (FIG. 2), which space mount plates 37 and 38, to which they are securely locked and fastened by angle plates 39. The mirrors M2 and M3 are adhesively secured to the mount plates 37 and 38 respectively and the mount plates, side plates, angle plates assembly is secured together by a weldment 40. Alternately the plates 37 may be similarly oriented and rigidly supported in other ways such as by making them parts of a casting or other unitary metal or plastic structure.

In any event the coupling of these paired mirrors M2 and M3 should be sufficiently rigid to render them optically immune to separable rotational vibrational effects around lateral and longitudinal axes. When this is done the roof support may permit even large vibrational deflections of the paired elements without degradation of their visual performance, which is highly desirable since angular vibrational deflections of 15 to 30 seconds of arc on separately-mounted mirrors will produce visible image degeneration.

The rotational rigidity is not optically self-compensating about a vertical axis, but the effect is strongly diminished and such vibrations imply shear deflections in the roof's plane which can be expected to be negligible. Translational vibrations of even large magnitudes are of no importance optically, and are largely optically self-compensating, in any event.

Vibrationally, then, this leaves only the problem of angular vibrations of mirror M1 and, there, the single-axis rotational mount aids materially in minimizing the vibration problem. The wide-set supports of good rigidity attached to the windshield header essentially eliminates vibration about the vehicles longitudinal and vertical axes, and the angular vibration about the transverse axis is minimized by using a combination of hard mounting, spring-loaded detents, and the anti-backlash worm drive.

Finally, to present a rectangular format to the field of view, the mirrors M2 and M3 are preferably made trapezoidal in shape, with their top edges being wider than their bottom edges, as shown in FIG. 2. This is desirable because the planes of the faces of M2 and M3, when in use, are not even approximately perpendicular to the light rays. Consequently such rays, measured from the driver's eye, travel farther to reach the upper edges of these mirrors than the lower edges and, because of the large horizontal field angles, thus diverge farther in reaching the upper edges than in reaching the lower edges. If M2 and M3 are made rectangular the unnecessary width at the bottom permits the driver to see parts of the interior structure of the RVS that would be esthetically undesirable and that might disorient him in terms of what he is seeing. This is prevented, and the desirable rectangular format obtained, according to the invention by cutting away the portions of M2 and M3 that would cause such undesirable visual effects. If desired, both the mirror M1 and the environmental window W may also be made slightly trapezoidal, although their lesser angles of inclination make it of less importance.

The last of the optical elements of the rear view system of the invention is the environmental window W which serves to complete the roof closure of the automobile and to protect the system from the elements. As shown in FIG. 1 it is preferably located aft of but closely adjacent to the M2–M3 mirror assembly and this can be readily accomplished by weather seal framing the window W within a "Neoprene" by conventional automotive glazing methods, to the shroud 14. Preferably the glass is ¼ inch twin ground plate, or float glass, fully tempered to provide the required strength and safety features. However laminated glass of the character employed in the windshield may be used and the shroud itself can be attached to the roof 13 by means of multiple fasteners such as sheet metal screws. In this connection too, it may be mentioned that the shape and construction of the shroud 14 is such as to provide a reasonably rigid structure that, in the case of a roll-over, will materially assist the rolling vehicle to more smoothly continue its movement to a wheels-down position.

Another important feature of the window W lies in its being positioned nearly vertically but with its upper edge aft of its lower one, thus presenting a "reverse" slope or angle that materially reduces the likelihood of obscuration by rain or snow and minimizes the operational requirements for mechanical and/or electrical defogging and deicing equipment.

Operation of the device of this invention is of course quite simple. Any driver, upon entering a vehicle equipped with one, and with it detented in the normal mode, can quickly, readily and accurately adjust it to his particular eye position by something less than 3.3 turns of the knob 32. Thereafter he can shift between the generally used normal mode (for regular driving) and the backlight mode (for backing or checking on closely following vehicles of low profile) at will, by pushing or pulling the same knob 32 to move the mirror M1 from one detented position to the other.

It is to be understood that the orientation and relative locations of the several optical elements are subject to variation with changes and variations in vehicle design. For example, the RVS of the invention has been described in a preferred embodiment as being centered on the driver's body centerline. However it may be desired to have a field of view wider than can be attained under this arrangement, i.e., a field which requires the optical elements to be wider than twice the distance from the driver's body centerline to the near side of the automobile. Indeed, in the interests of outside appearance, and to provide full rear vision for front seat passengers, it may be desirable to have the system extend entirely across the car from one side to the other. This, or any lesser widening of the system that extends it more toward the far than toward the near side of the automobile from the driver, is completely acceptable because, while it is important that the system be wide enough to include the driver's body centerline, it need not be symmetric about the line for successful operation.

Accordingly, the form of the invention herewith shown and described is to be taken as an illustrative embodiment only of the same, and various changes in the shape, size, construction and arrangement of parts, as well as various procedural changes in producing it may be resorted to without departing from the spirit of the invention as defined in the subjoined claims.

I claim:

1. In a periscopic rear viewing system for use in automotive vehicles that have enclosed passenger areas provided with forward and rearward sight openings glazed by windshields and rear windows respectively, which system includes a viewing mirror adapted to be located within and below an opening in the roof of such a passenger area and forwardly and upwardly of the eye positions of drivers of varying heights in said area, means for so locating said viewing mirror in said area and mounting the same for pivotal movement about a generally horizontal axis to permit adjustment of its angle of elevation, a field mirror positioned above said roof to receive light rays from a selected field of rearward vision, and a relay mirror positioned and angularly related with said field mirror to transmit said light rays to said viewing mirror through said opening in said roof; the improvement in which said viewing mirror locating and mounting means include means mounting said viewing mirror for rapid switching thereof between and for setting the same in a first angularly adjusted normal mode position in said pivotal movement wherein light rays travelling over said roof from a selected field to the rear of said vehicle will be directed toward said eye positions by way of said viewing mirror and a second angularly adjusted backlight mode position in said pivotal movement wherein light rays travelling through said rear window from objects closer to the rear of said vehicle than said selected field will be directed toward said eye positions by way of said viewing mirror, and in which said viewing mirror locating and mounting means also include means mounting said viewing mirror for a different and relatively slower movement about said axis while said viewing mirror is set in one of said angularly adjusted mode positions to further angularly adjust the same relative to said mode position whereby to accommodate the eye positions of drivers of varying heights to both said mode positions simultaneously.

2. Rear viewing apparatus as defined in claim 1, in which said mounting for switching and setting means comprise means mounting said viewing mirror for free movement about said axis between and into said first and second angularly adjusted mode positions, and detents for locating and holding said mirror in said angularly adjusted mode positions; and said mounting for different and slower movement means comprise means mounting said viewing mirror for controlled movement thereof about said axis to adjust the same to drivers of varying heights while said viewing mirror is located and held in one of said angularly adjusted mode positions.

3. Rear viewing apparatus as defined in claim 1, in which said generally horizontally arranged axis is located adjacent the lower edge of said viewing mirror to preserve substantially the same lower field of view for all drivers.

4. Rear viewing apparatus as defined in claim 1, in which said relay mirror is also positioned aft and upwardly of said viewing mirror and extends through and a substantial distance upwardly beyond said roof, and said field mirror is also positioned above and in general vertical alignment with but offset rearwardly from said viewing mirror, to minimize the fore and aft dimension that is required in said roof opening to permit said light rays received from said selected field of rearward vision to be directed through said opening to said eye positions by way of said relay and viewing mirrors.

5. Rear viewing apparatus as defined in claim 4, in which the plane of the field mirror of said mirror assembly is at an angle less than 45° from the horizontal to receive light rays from said selected field and direct them downwardly and forwardly, and the plane of said relay mirror is at an angle of between 50°and and greater than the angle of said field mirror from the horizontal to receive said downward and forwardly directed light rays from said field mirror and to direct the same forwardly and downwardly toward said viewing mirror, and the fore and aft dimensions of said roof opening is less than 6 inches.

6. Rear viewing apparatus as defined in claim 1, in which said relay mirror and said field mirror are directly connected together as a unitary structure by commonly shared rigid structural elements to vibrate as a pair and be rendered substantially optically immune to separable rotational vibrational effects around lateral and longitudinal axis.

* * * * *

UNITED STATES PATENT OFFICE
CERTIFICATE OF CORRECTION

PATENT NO. : 3,915,562
DATED : October 28, 1975
INVENTOR(S) : John R. Ermlich

It is certified that error appears in the above-identified patent and that said Letters Patent are hereby corrected as shown below:

Col. 4, line 33, "reflectance" should be --reflection--.

Col. 10, line 33, --40°-- should be inserted after "and" (first occurence).

Signed and Sealed this eighteenth Day of May 1976

[SEAL]

Attest:

RUTH C. MASON
Attesting Officer

C. MARSHALL DANN
Commissioner of Patents and Trademarks